Figure 1:
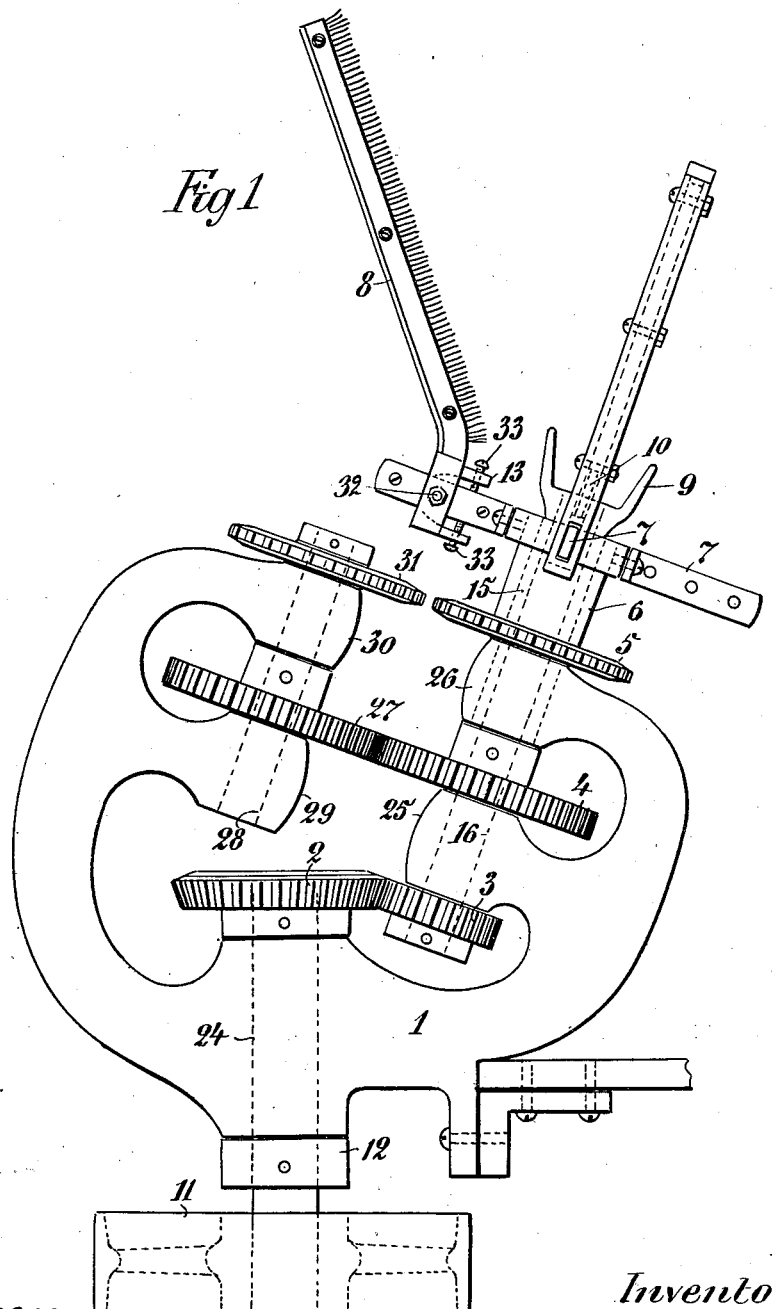

J. HANSEN.
MACHINE FOR CLEANING SEPARATOR DISKS.
APPLICATION FILED NOV. 4, 1912.

1,077,067.

Patented Oct. 28, 1913.

2 SHEETS—SHEET 1.

Witnesses

Inventor
JORGEN HANSEN,
By
Attorneys

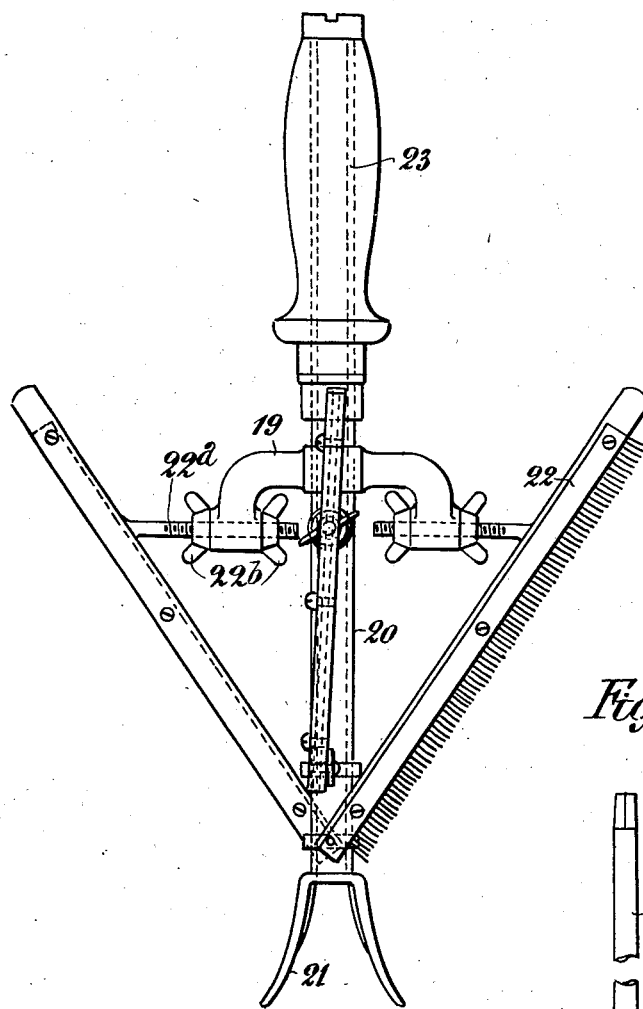
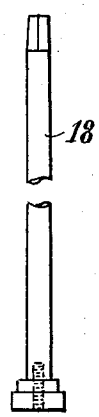

UNITED STATES PATENT OFFICE.

JORGEN HANSEN OF KOLDING, DENMARK.

MACHINE FOR CLEANING SEPARATOR-DISKS.

1,077,067.  Specification of Letters Patent.  Patented Oct. 28, 1913.

Application filed November 4, 1912. Serial No. 729,465.

*To all whom it may concern:*

Be it known that I, JORGEN HANSEN, citizen of the Kingdom of Denmark, residing at Rendebanen 1, Kolding, county of Ribe, Kingdom of Denmark, have invented certain new and useful Improvements in Machines for Cleaning Separator-Disks, of which the following is a specification.

As is well known, the proper cleaning of the skimming disks of the bowl-inset in centrifugal cream separators is a very troublesome process, since the dirt in the milk is deposited on the disks in hard cakes, or crusts, which can only be removed with difficulty by means of strong and long-continued brushing after previous soaking in diluted soda-lye. For cleaning these disks, common, stiff brushes have hitherto been used, but they were not practical, and therefore the present invention refers to a machine which in few minutes can clean a large number of skimming-disks.

My invention is set forth in the accompanying drawings, in which—

Figure 1 is a side view of the machine; Fig. 2 shows the inner brush detached; and Fig. 3 is the guidespindle for the inner brush.

The machine consists of a G-shaped frame 1, which forms a bearing for the main shaft 24, carrying a pulley 11. On the shaft 24 is a collar 12 outside of the frame, and on said shaft, within the frame, is a conical cog-wheel 2 in mesh with a pinion 3 on the shaft 16, which runs in the bearings 25 and 26. On the shaft 16 there is also disposed a cog-wheel 4, which meshes with another cog-wheel 27 on the shaft 28 running in the bearings 29 and 30. On this shaft there is also disposed a sprocket-wheel 31, on which a chain not shown in the drawing transmits the motive power to another sprocket-wheel 5 on the outer end of the hollow shaft 6. This shaft, which runs in the bearing 26, surrounds the inner shaft 16 and bears, on its outermost end, a number of lateral arms 7 providing supports for the brush-wings 8 which are secured by bolts 32 in such a way that they can be adjusted at different angles by means of set-screws 33 in the brackets 13. On the end of the inner shaft 16 there is a finger or fork 9, and a screw 10 to which the guide-spindle 18 (Fig. 3) may be secured.

On the guide-spindle 18 there may be disposed a tube 20 with handle 23 and finger, or fork, 21. On this tube are disposed a number of oblique, brush-carrying arms 22 which may be adjusted to different angles. The adjusting means shown consists of bracket arms 19 that receive screws $22^a$ on the brush-carrying arms 22, there being wing nuts $22^b$ to move said screws axially and thus vary the angle of said arms 22.

The machine operates in the following manner; to wit:—The pulley 11 turns the shaft 24, whose motion is transmitted to the shaft 16, which turns in one direction, transmitting motive power to the finger, or fork, 9, while the brush-wings 8 are turned in the opposite direction by means of the gears 4 and 27, shaft 28 and sprockets 31 and 5. A skimming disk from a centrifugal cream separator is now placed loosely over the finger, or fork 21, and the tube 20 is passed over the guide-spindle 18 until the fingers, or forks, 21 are grasped by the fingers 9, when the brushes 22 will turn in a direction opposite to that of the brushes 8, while the disk remains still between the two sets of brushes, as the brushes revolve in opposite directions with equal speed. As soon as the disk is cleaned, the tube 20 is removed from the guide-spindle 18, and a new disk is put in place. In this manner the cleaning of each disk only takes as many seconds as the old method took minutes.

It is obvious that the different parts of the machine may be varied in many different ways without deviating from the principle of the invention.

Having now described my invention what I claim as new and desire to secure by Letters Patent is:

1. A machine for cleaning the skimming disks of centrifugal cream separators, comprising two shafts one within the other, means for turning the shafts in opposite directions, two sets of adjustable brush-carrying arms between which the disks are adapted to be placed, one of said sets of brush-carrying arms being actuated from the outer shaft, the other set being removably mounted and adapted to be detachably coupled to said inner shaft.

2. In a machine for cleaning the skimming disks of centrifugal cream separators, two shafts mounted to turn one within the other, wings on the outer shaft carrying brush arms, brush arms detachably coupled to the inner shaft, means for turning the inner shaft, an intermediate shaft, a gear wheel on the inner shaft in mesh with a gear wheel on the said intermediate shaft to drive the latter, and a chain and sprocket wheel connection between the said intermediate shaft and the said outer shaft.

3. In a machine for cleaning the skimming disks of centrifugal cream separators, inner and outer sets of arms carrying brushes between which the disks are adapted to be placed, supports on which the outer brush-carrying arms are adjustably mounted, brackets on the said arms, and set screws carried by said brackets for adjusting the said outer brush-carrying arms to different angles according to the shape of the disks.

4. In a machine for cleaning the skimming disks of centrifugal cream separators, inner and outer sets of brushes between which the disks are adapted to be placed, the inner set of brushes comprising a number of oblique brush-carrying arms, a tube on which the arms are disposed, bracket arms, screws on the brush-carrying arms and engaging said bracket arms, and means for moving the screws in said bracket arms to adjust the said brush-carrying arms.

5. A machine of the character described, comprising inner and outer sets of radially adjustable brush-carrying arms, means for rotating the inner and outer arms in opposite directions, one set of arms being removably mounted.

6. In a machine of the character described an outer brush-carrying arm, means for adjusting said arm laterally, an inner brush-carrying arm, means for adjusting the inner arm laterally, and means for rotating the inner and outer arms in opposite directions.

7. In a machine of the character described, a frame, a spindle on said frame, a brush-carrying member fitting said spindle, revolving means supported on said frame independently of the spindle, and means on the said brush-carrying member to detachably engage with the said revolving means.

8. A machine of the character described, comprising a frame, a spindle on said frame, a brush-carrying member fitting said spindle, revolving means supported on said frame independently of the spindle, means on the said brush-carrying member to detachably engage with the said revolving means, a series of lateral arms supported to rotate on the frame around the axis of the said spindle, means for rotating said arms, and brush-carrying means supported on said arms.

9. A machine of the character described, comprising a frame, outer brush-carrying means, means for rotating said outer brush-carrying means, a member revolubly mounted on the frame, inner brush carrying means and a co-acting member on said inner brush-carrying means, to engage said revolubly mounted member.

Signed by me at Copenhagen, Denmark, this 12th day of October 1912.

In testimony whereof I affix my signature in presence of two witnesses.

JORGEN HANSEN.

Witnesses:
  CHARLES HUDE,
  TISTRAN WOLSING.